United States Patent Office 3,708,536
Patented Jan. 2, 1973

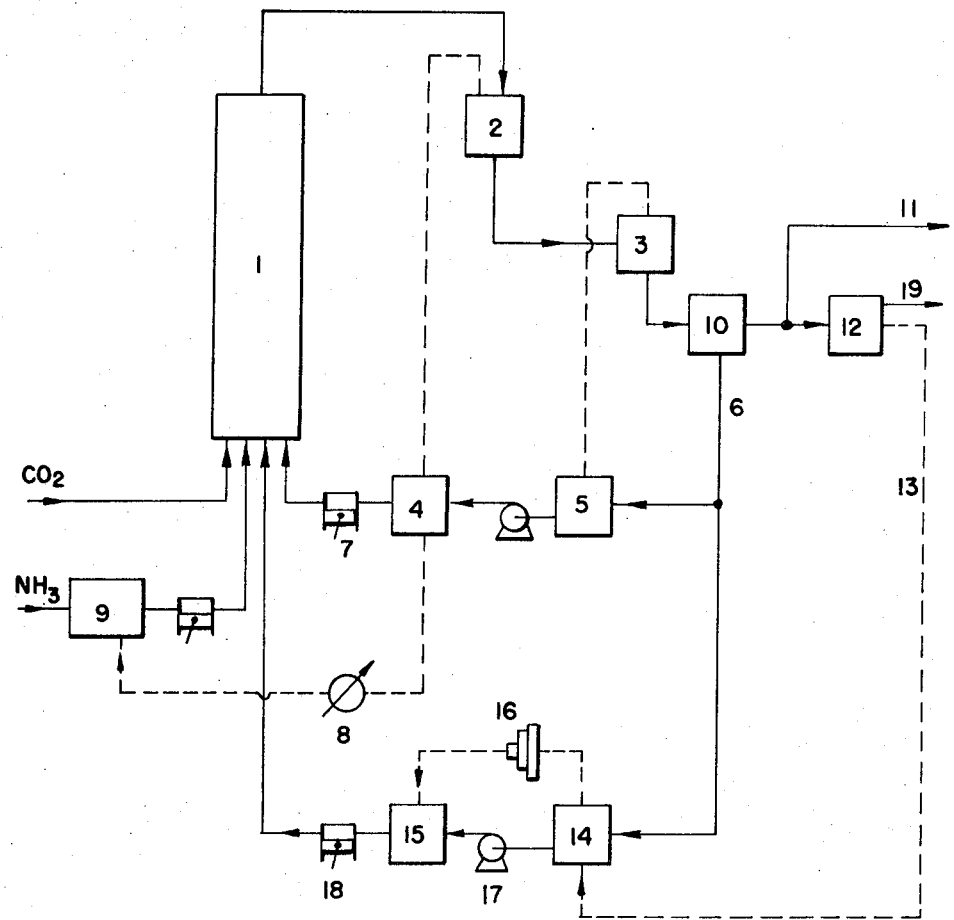

3,708,536
RECYCLING MELAMINE SYNTHESIS OFFGAS TO UREA SYNTHESIS
Engelbert Hillenbrand, Ludwigshafen, Germany, assignor to Badische Anilin- & Soda-Fabrik Aktiengesellschaft, Ludwigshafen (Rhine), Germany
Filed July 23, 1969, Ser. No. 844,089
Claims priority, application Germany, July 25, 1968, P 17 70 969.2
Int. Cl. C07c 127/00
U.S. Cl. 260—555 A 4 Claims

ABSTRACT OF THE DISCLOSURE

Offgas consisting essentially of ammonia and carbon dioxide is formed in the synthesis of melamine from urea. This is absorbed in two stages in water or an aqueous solution of ammonium carbamate or urea for return to urea synthesis. In the first stage the gas is treated with an amount of absorbent solution which is not sufficient to absorb the whole of the gas. The remaining offgas and the solution formed are then compressed separately from one another to the pressure which is sufficient for the absorption of the remaining offgas into the solution and the offgas is then absorbed. The solution thus formed is returned to the high pressure section of the synthesis plant.

In the synthesis of melamine from urea carried out at atmospheric or superatmospheric pressure according to the equation:

$$6H_2N\text{---}CO\text{---}NH_2 \rightarrow C_3N_6H_6 + 6NH_3 + 3CO_2$$

ammonia and carbon dioxide are formed as byproducts in the ratio required for the synthesis of urea. For this reason the urea and melamine syntheses have been combined with each other in such a way that the melamine synthesis offgas is utilized by supplying it to urea synthesis.

Various proposals have already been made for utilizing the melamine synthesis offgas for the synthesis of urea but these relate mostly to the synthesis of melamine carried out at superatmospheric pressure.

According to one prior art method, the melamine offgas obtained at a pressure of from 150 to 300 kg./cm.$^2$ and a temperature of from 300° to 400° C. is introduced direct into the urea reactor which is provided with cooling means for removing the heat introduced with the hot gases.

According to another prior art method (U.S. patent specification No. 3,239,522) the melamine synthesis offgas is combined with the offgas obtained by expanding the urea melt, the combined offgas stream is scrubbed with a solution containing ammonium carbamate and the solution is recycled to urea synthesis.

Generally the equilibrium relationships within and between the individual decompression or absorption stages of a urea recycle synthesis process are so correlated that appreciable amount of makeup ammonia and carbon dioxide cannot be supplied in any stages without additional solvent as for example water, aqueous ammonium carbamate solution or urea-containing ammonium carbamate solution being provided. While it is true that recycle melamine offgas replaces part of the starting materials of urea synthesis, the water required to absorb this offgas has an unfavorable effect on urea synthesis and on the layout of the plant.

There are no significant problems in absorbing offgas which is at superatmospheric pressure because in this case naturally the amount of liquid necessary for absorption of the gas is fairly small.

This amount of water is considerably greater however when offgas from the melamine synthesis which is at atmospheric or only slightly elevated pressure is recycled to urea synthesis by absorption in water. In principle it would be possible to compress this offgas prior to its absorption and to absorb it in an appropriately smaller amount of solvent at superatmospheric pressure. This procedure has the disadvantage however that a large amount of energy is required for the compression of the whole of the offgas.

With regard to the recirculation of offgas at atmospheric pressure to urea synthesis it is known that this offgas may be absorbed in water or an aqueous solution containing ammonium carbamate which after compression is subjected to desorption at superatmospheric pressure. The gas mixture of ammonia and carbon dioxide thus obtained is then absorbed in a fairly small amount of solvent and supplied to urea synthesis. The method also has the disadvantage of a high energy consumption due to the high heat requirement for the desorption of the gas under pressure.

It is an object of the present invention to return the offgas under atmospheric or only slightly elevated pressure obtained in melamine synthesis to urea synthesis with the smallest possible amount of water and with the smallest possible consumption of energy.

We have found that this object is achieved by absorbing a part of the offgas, e.g. about 26 to 35% by weight in a first absorption stage in an amount of water (which may contain ammonium carbamate and/or urea) which is insufficient to absorb the whole of the offgas, at the pressure at which it is obtained, and then compressing the residual offgas and the aqueous phase separately from each other to a pressure sufficient to absorb the residual offgas in the aqueous phase, absorbing the residual offgas at this pressure in a second absorption stage and introducing the solution obtained into the high pressure zone of the urea synthesis.

The process according to this invention may be carried out by treating the whole of the melamine offgas in the first stage at the pressure at which it is obtained with an amount of solvent which is sufficient to dissolve the whole of the offgas in the amount of solvent used at the higher pressure of the second absorption stage. The undissolved gas and the aqueous phase obtained are then compressed separately to the pressure of the second stage and at this pressure the residual gas is absorbed in the aqueous phase.

It is however also possible to divide the offgas, before it is washed with the solvent, one portion being equivalent to the amount which will be completely absorbed by the amount of solvent used at the lower pressure, i.e. at the pressure at which the offgas is obtained, while the remaining portion of the offgas is not treated with the absorbent until it has been compressed and passed into the second stage. This has the advantage that the portion not absorbed at the lower pressure only comes into contact once with the solvent.

The pressure for absorption of the offgas in the first stage is determined by the pressure at which the melamine offgas is obtained. This is from about 1 to 5 atmospheres absolute.

The pressure to be maintained in the second stage may vary within wide limits. It is advantageous to choose for this stage a pressure equivalent to the pressure prevailing in the decompression stage of urea synthesis in which the major portion of the ammonium carbamate which has not been converted into urea is decomposed. In this stage the pressure is from about 10 to 30 atm. abs.

Depending on the amount of melamine offgas to be recycled, its ratio of ammonia:carbon dioxide and the amount of any water content, and depending on the pressure chosen in the second absorption stage, the amount of water is calculated which is necessary in order to absorb the whole of the melamine offgas according to the process of this invention.

Since the stages for the absorption of the melamine offgas are similar as regards their pressures to the stages present in the urea recycle method in which the offgas of the urea synthesis is absorbed again, the offgas of the urea synthesis and of the melamine synthesis which are equivalent in pressure are combined and absorbed together in a preferred embodiment of the process according to this invention.

An embodiment of the process according to this invention will now be described with reference to the drawings:

1 denotes a reactor in which ammonia and carbon dioxide are converted into urea by a conventional method. The melt is withdrawn from the reactor and freed from ammonium carbamate which has not been converted into urea in a decompression stage 2 at a pressure of 10 to 30 atmospheres absolute and in a decompression stage 3 at a pressure of about 1 to 5 atm. abs. The offgas streams from the two decompression stages, which consist essentially of ammonia, carbon dioxide and water, are passed respectively into absorbers 4 and 5 in which they are absorbed into a solvent. The solvent may be for example vapor condensate if the solution coming from decompression stage 3 is evaporated in 10 (evaporator method) or the mother liquor freed from urea crystals may serve as solvent if urea is crystallized therefrom (crystallization method). The solvent first passes through absorber 5 and then is compressed by means of a pump to the higher pressure of the absorber 4. A concentrated ammonium carbamate solution having a water content of about 20% is conveyed from absorber 4 through a pressure pump 7 into the reactor 1. When urea synthesis is carried out with a large excess of ammonia, pure ammonia may additionally be withdrawn from absorber 4, condensed in a cooler 8 and returned to a reservoir 9 whence it passes again into reactor 1. The urea solution coming from the last decompression stage, as already stated above, is either evaporated at 10 or subjected to crystallization. The anhydrous urea in the form of a melt, crystals or prills is introduced at least in part into a melamine plant 12 and converted therein into melamine. The urea not required for melamine synthesis is withdrawn at 11. The offgas from melamine synthesis passes through line 13 into an absorber 14 into which a further portion of the solvent is introduced through line 6. Melamine is withdrawn through line 19. The amount of solvent is so regulated that it is sufficient to absorb the whole of the melamine offgas at the higher pressure of the following absorption stage 15. The offgas not absorbed in absorber 14 is raised to the pressure of absorber 15 in a compressor 16, while the aqueous phase is compressed by means of a pump 17 and introduced into absorber 15. Here the unabsorbed gas is wholly taken up by the aqueous phase. The concentrated carbamate solution having a content of about 20% of water which leaves absorber 15 is conveyed by means of a pressure pump 18 into reactor 1.

Since the absorbers 4 and 15 and the pressure pumps 7 and 18 operate under approximately the same conditions, it is possible to combine the two absorbers and to condense the offgas of urea synthesis and of melamine synthesis in an aqueous phase in a single stage and to return it by means of a single pump to the urea reactor.

The invention is illustrated by the following examples.

EXAMPLE 1

A gas mixture consisting of 370 parts by weight of ammonia and 370 parts by weight of carbon dioxide is introduced into absorber 14 (cf. drawing) at a pressure of 1.2 atm. abs. and scrubbed at a temperature of 50° C. with 185 parts by weight of water. 26% by weight of the gas is absorbed by the water. The unabsorbed gas has its pressure raised by means of compressor 16 to that which prevails in the second absorber 15 and is then introduced into the same. The aqueous phase withdrawn from the first column 14 is similarly compressed to 21 atm. abs. by the pump 17 and is passed into the column 15 for the remainder of the gas mixture to be absorbed.

If the gas mixture is to be absorbed in water in a single absorber at a pressure of 1.2 atm. abs. and a temperature of 50° C., the amount of water required would be 710 parts by weight.

EXAMPLE 2

The gas mixture, under otherwise the same conditions as in Example 1, is treated with water in column 14 but at a pressure of 2.5 atm. abs. 35% by weight of the gas mixture is absorbed. The remainder of the gas mixture is absorbed in column 15 at 21 atm. abs. as described in Example 1.

I claim:

1. A process for recycling offgas, which is formed in the synthesis of melamine from urea at atmospheric or slightly elevated pressure and consisting essentially of ammonia and carbon dioxide, to a high pressure urea synthesis zone for the reaction of carbon dioxide and ammonia to ammonium carbamate and conversion of the ammonium carbamate into urea, which process comprises: absorbing about 26 to 35% by weight of said offgas in a first absorption stage at 1 to 5 atmospheres in an amount of water, which may contain ammonium carbamate and/or urea, which is insufficient to absorb the whole of the offgas; and then compressing the residual offgas and the aqueous phase from said first stage separately from each other to a higher pressure of from 10 to 30 atmospheres which is sufficient to absorb the residual offgas in the aqueous phase; wholly absorbing said residual offgas from said first stage at this higher pressure in a second absorption stage; and introducing the solution thus obtained into the high pressure zone of the urea synthesis.

2. A process as claimed in claim 1 wherein the offgas from melamine synthesis is combined with the offgas from urea synthesis which is at a similar pressure to the offgas from melamine synthesis and both offgases are absorbed together.

3. A process as claimed in claim 1 wherein said water contains at least one of the compounds ammonium carbamate and urea.

4. A process as claimed in claim 1 wherein the first absorption stage is maintained at the same pressure as the offgas obtained from the melamine synthesis.

References Cited

UNITED STATES PATENTS

| 3,544,628 | 12/1970 | Hsu | 260—555 A |
| 3,414,571 | 12/1968 | Haines et al. | 260—249.7 A |
| 3,492,302 | 1/1970 | Abe et al. | 260—555 A |
| 3,503,970 | 3/1970 | Kanai et al. | 260—555 A |

BERNARD HELFIN, Primary Examiner

M. W. GLYNN, Assistant Examiner

U.S. Cl. X.R.

260—249.7